United States Patent
Rehman et al.

(10) Patent No.: US 9,437,877 B2
(45) Date of Patent: Sep. 6, 2016

(54) TUNGSTEN OXIDE MODIFIED ORDERED MESOPOROUS CARBON CATALYST FOR FORMIC ACID OXIDATION IN DIRECT FORMIC ACID FUEL CELLS

(71) Applicant: KING FAHD UNIVERSITY OF PETROLEUM AND MINERALS, Dhahran (SA)

(72) Inventors: Ateeq Ur Rehman, Dhahran (SA); Shakeel Ahmed, Dhahran (SA); Mohammad Mozahar Hossain, Dhahran (SA); Sleem Ur Rahman, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 8 days.

(21) Appl. No.: 14/492,762

(22) Filed: Sep. 22, 2014

(65) Prior Publication Data
US 2016/0087286 A1    Mar. 24, 2016

(51) Int. Cl.
    *H01M 4/92*    (2006.01)
    *H01M 8/22*    (2006.01)

(52) U.S. Cl.
    CPC ............... *H01M 4/926* (2013.01); *H01M 8/22* (2013.01)

(58) Field of Classification Search
    CPC .............................. H01M 4/926; H01M 8/22
    USPC ....................................................... 429/483
    See application file for complete search history.

(56) References Cited

U.S. PATENT DOCUMENTS

2003/0198852 A1* 10/2003 Masel ................... H01M 4/605
                                                                            429/494
2008/0182745 A1*  7/2008 Finkelshtain ......... H01M 4/921
                                                                            502/101

FOREIGN PATENT DOCUMENTS

IN             20110021714            11/2012

OTHER PUBLICATIONS

Chun'an Ma et al., "Study of Nano-WO3 Modified Carbon Nanotubes Supported Pt Electrocatalyst for Oxygen Reduction Reaction", Journal of the Electrochemical Society, 2014, vol. 161, Issue 3, Abstract.*
U.S. Appl. No. 14/496,889, filed Sep. 25, 2014, Rehman, et al.
Jongmin Shim et al., "One-Pot Synthesis of Intermettalic Electrocatalysts in Ordered Large-Pore Mesoporous Carbon/Silica Toward Formic Acid Oxidation", ACS Nano, 2012, vol. 6, No. (8), Abstract Only.
Chun'an Ma et al., "Study of Nano-$WO_3$ Modified Carbon Nanotubes Supported Pt Electrocatalyst for Oxygen Reduction Reaction", Journal of the Electrochemical Society, 2014, vol. 161, Issue 3, Abstract Only.
Xiulei Ji et al., "Nanocrystalline Intermetallics on Mesoporous Carbon for Direct Formic Acid Fuel Cell Anodes", Nature Chemistry, 2010, vol. 2, pp. 286-293.

* cited by examiner

*Primary Examiner* — Karie O'Neill Apicella
(74) *Attorney, Agent, or Firm* — Oblon, McClelland, Maier & Neustadt, L.L.P.

(57) ABSTRACT

Electrocatalysts for the anode electro-oxidation of formic acid in direct formic acid fuel cells (DFAFCs). The Pd-, Pt- or PdPt-based electrocatalysts contain $WO_3$-modified ordered mesoporous carbon (OMC) as support material. Compositions and ratios of Pd:Pt in the electrocatalysts as well as methods of preparing and characterizing the catalysts and the $WO_3$-OMC support material.

20 Claims, 9 Drawing Sheets

TUNGSTEN OXIDE MODIFIED ORDERED MESOPOROUS CARBON CATALYST FOR FORMIC ACID OXIDATION IN DIRECT FORMIC ACID FUEL CELLS

BACKGROUND OF THE INVENTION

1. Technical Field

The present invention relates to electrocatalysts, particularly Pd and Pt-based electrocatalysts on a $WO_3$-ordered mesoporous carbon support, their use in direct formic acid fuel cells for portable electronic device applications and a process of electro-catalytic oxidation of formic acid.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent years direct formic acid fuel cells (DFAFCs) have received growing interest as a compact generator, for electronic devices and transportation means. In a DFAFC, formic acid oxidation (FAO) takes place at the anode side while reduction occurs at the cathode side (Cynthia A R, Akshay B, Peter G P. Recent Advances in Electrocatalysis of Formic Acid Oxidation. Springer London, Lecture Notes in Energy 9(2013) 69-87—incorporated herein by reference in its entirety). Generally, the DFAFC offers the following major advantages: (1) safe and easy to handle, non-toxic, (2) can create high theoretical open circuit potential of 1.48 V which is larger than hydrogen (1.23 V) and methanol (1.21 V), and (3) low cross over through membrane than methanol and ethanol. Although formic acid has lower energy density (2104 Wh/L) compared to methanol (4900 Wh/L), the low cross over through the membranes allows the DFAFCs to operate at high formic acid concentrations (5-12 M) compared to methanol concentration (1-2 M), ensuing overall higher energy outputs (Cynthia A R, Akshay B, Peter G P. Recent Advances in Electrocatalysis of Formic Acid Oxidation. Springer London, Lecture Notes in Energy 9(2013) 69-87; Olumide W, Zhiyong Z, Changhai L, Wenzhen L., Electrochim. Acta 2011; 55(13): 4217-4221 W L Qu, Z B Wang, X L Sui, D M Gu, G P Yin, Fuel Cells 2013; 13 (2): 149-157; Zhiming C, Cheng G, Chun X G and Chang M L., J. Mater. Chem. A, 1(2013) 1179-1184—each incorporated herein by reference in its entirety).

In addition to the above technical advantages, mass scale applications of DFAFCs can also create opportunities of utilizing $CO_2$ (from fossil fuel combustion) as a source of formic acid production via electrochemical conversion of carbon dioxide (Charles D, Paul L. R. John B. K and John N., Electrochem. Soc. (2008); 155 (1): 42-49; Hui Li and Oloman, C. Continuous co-current electrochemical reduction of carbon dioxide. WO2007041872 B1, 2007—each incorporated herein by reference in its entirety). This integrated approach not only offers DFAFCs as way of efficient energy generator but also contributes to the global efforts on the $CO_2$ utilization/sequestration, addressing the greenhouse gas effects (Charles D, Paul L. R, John B. K and John N., Electrochem. Soc. (2008); 155 (1): 42-49; Hui Li and Oloman, C. Continuous co-current electrochemical reduction of carbon dioxide. WO2007041872 B1, 2007—each incorporated herein by reference in its entirety). The process of converting $CO_2$ to formic acid will be only economically viable if the energy demand for the electrochemical conversion of $CO_2$ to formic acid is supplemented from a renewable source such as solar energy. With the global efforts and recent advancements of the solar technologies, the outlook remains positive for this integrated approach.

In order to materialize the aforementioned advantages of DFAFCs, research and development efforts are underway. Despite some advancement, the present DFAFC systems suffer from some practical issues which need to be addressed in order to exploit their full benefits. The foremost drawback of the present DFAFCs is the use of expensive and scarce noble metal-based electrocatalysts to accelerate the slow kinetics of the anodic electro-oxidation of formic acid (Cynthia A R, Akshay B, Peter G P. Recent Advances in Electrocatalysis of Formic Acid Oxidation. Springer London, Lecture Notes in Energy 9(2013) 69-87; Olumide W, Zhiyong Z, Changhai L, Wenzhen L., Electrochim. Acta 2011; 55(13): 4217-4221; Yang L Jun, Su Neng, Ting and Shi Jun, Sci China Chem. 55(2012) 391-397; Feng, L G; Yang, J; Hu, Y; Zhu, J B; Liu, C P Xing, W., Int. J. Hydrogen Energ. 37(2012) 4812-4818; Yuan H Qin, Yue-J, Hou-H Y, Xin S Z, Xing G Z, Li N, Wei K Y., J. Power Sources 196 (10)(2011) 4609-4612—each incorporated herein by reference in its entirety). In addition to their high costs, the noble metal-based catalysts also suffer from severe poisoning due to the strong adsorption of the carbon monoxide (Haan J L, Masel R. I., Electrochim. Acta 54(2009) 4073-4078—incorporated herein by reference in its entirety) and chemical instability in acidic environment. Among the noble metals, Pt and Pd are extensively studied as active components of the anode electrocatalysts. Although, Pd-based electrocatalysts showed higher catalytic activity for FAO reactions than Pt, it still lacks stability for the long period of operations (Yu Zhu, Yongyin K, Zhiqing Z, Qun Z, Junwei Z, Baojia X and Hui Y., Electrochem. Commun. 10(2008) 802-805; Xiao M Wang, Yong Y X., Electrochim. Acta 54(2009) 7525-7530—each incorporated herein by reference in its entirety). These difficulties warrant further research to develop highly durable and efficient Pd-based electrocatalysts for DFAFCs. In the open literature, various metals have been explored as promoter to enhance the catalytic activity and stability of Pd catalysts. The use of transition metals also helps reducing the use of noble metals in the catalyst formulation while maintaining or even improving the catalytic activity. The most common studied bimetallic catalysts include PdCo, PdNi, PdAu, PdPt, PtBi, PdSn and PdFe (Lu Zhang, Ling W, Yanrong Ma, Yu C, Yiming Z, Yawen T, Tianhong L., Appl. Catal. B, Environ. 138-139(2013) 229-235; Rongfang Wang, Hui W, Xingli W, Shijun L, Vladimir L and Shan J., Int. J. Hydrogen Energ. 38(2013) 13125-13131; Maja D., Obradovic, Sne, Gojkovi, Electrochim. Acta 88(2013) 384-389; Zhao, Zhua, Liuc and Wei Xing, Appl. Catal. B: Environ. 129(2013) 146-152; Zhang, Chun He, Jiang, Rao and Shi-Gang Sun, Electrochem. Commun. 25(2012) 105-108; DandanTu, Bing, Wang, Deng and Ying Gao, Appl. Catal. B: Environ. 103(2011) 163-168; Yanxian Jin, Chun'an M, Meiqin S, Youqun C, Yinghua X, Tao H, Qian H and Yiwai M., Int. J. Electrochem. Sci. 7(2012) 3399-3408—each incorporated herein by reference in its entirety).

Conventionally, the active metals/promoters are dispersed on a suitable support material to achieve highest possible catalytic activity using a minimum amount of metal. The supports also provide the required strength to the electrocatalyst in acidic environment of the fuel cells (Ermete Antolini., Appl. Catal. B: Environ. 88(2009) 1-24—incorporated herein by reference in its entirety). Like the conventional supported catalysts, high surface area, large pore volume and superior electrical conductivity of the support is highly desirable. The high surface area of the support allows better dispersion and less agglomeration of the nano-sized active metal particles, resulting in optimum catalytic performance. Among the studied support materials, large surface area carbon such as Vulcan XC72 carbon black is possibly the most widely used in electrocatalysts. With some advantages there are drawbacks of Vulcan XC72 carbon black supported electrocatalysts. Among those, the most important is non-contribution of some of the loaded expensive noble metals particles which are trapped in the deep cracks of the phase boundaries and micropores of the carbon black support (Yuyan Shao, Geping Y, Jiajun W, Yunzhi G and Pengfei S., J. Power Sources (2006); 161 (1): 47-53—incorporated herein by reference in its entirety). Carbon black also suffers from serious corrosion problems in the fuel cell oxidation operation (Sudong Yang, Xiaogang Z, Hongyu M, Xiangguo Y., J. Power Sources 175(2008) 26-32; Bruce R. R J. Frank R. M and Elton J. C., J. Electrochem. Soc. 142(1995) 1073-1084—each incorporated herein by reference in its entirety). In order to avoid these problems there are many other carbon materials have been investigated as electrocatalyst support, including carbon nanotubes (CNTs) (Chun'an M., Yanxian J., Meiqin S., Youqun Ch., Yinghua X., Wenping J., Qiaohua Y., Jiabin C., Dongkai C., Shuomiao C., Journal of the Electrochemical Society 161(2014): F246-F251; Olumide W, Zhiyong Z, Changhai L, Wenzhen L., Electrochim. Acta 2011; 55(13): 4217-4221; Zhiming C, Cheng G, Chun X G and Chang M L., J. Mater. Chem. A, 1(2013) 1179-1184; Yanxian Jin, Chun'an M, Meiqin S, Youqun C, Yinghua X, Tao H, Qian H and Yiwai M., Int. J. Electrochem. Sci. 7(2012) 3399-3408; Yuyan Shao, Geping Y, Jiajun W, Yunzhi G and Pengfei S., J. Power Sources (2006); 161 (1): 47-53; Sudong Yang, Xiaogang Z, Hongyu M, Xiangguo Y., J. Power Sources 175(2008) 26-32—each incorporated herein by reference in its entirety), nanofibers (CNFs) (Yuan H Qin, Yue-J, Hou-H Y, Xin S Z, Xing G Z, Li N, Wei K Y., J. Power Sources 196 (10)(2011) 4609-4612—incorporated herein by reference in its entirety) ordered mesoporous carbon (OMCs) (J. Zeng, C. Francia, C. Gerbaldi, V. Baglio, S. Specchia, A. S. Aricò, P. Spinelli., Electrochim. Acta 94(2013) 80-91; Sang H Joo, Seong J C, Ilwhan O, Juhyoun K, Zheng L, Osamu T & Ryong R., Nature 412(2001) 169-172; Sang Hoon Joo, Chanho P, Dae J Y, Seol-Ah L, Hyung I L, Ji M K, Hyuk C, Doyoung S., Electrochim. Acta 52(2006) 1618-1626; Zhi-Peng Sun, Xiao G Z, Hao Tong, Yan Y L, Hu L L., J. Colloid and Interf. Sci. 337(2009) 614-618; Juqin Zeng, Carlotta F, Mihaela A. D, Alessandro H. A. M V, Vijaykumar S. I, Stefania S, and Paolo S., Ind. Engg. Chem. Res. 51(2012) 7500-7509; Chuntao L, Meng C, Chunyu D, Jing Z, Geping Y, Pengfei S and Yongrong Sun., Int. J. Electrochem. Sci. 7(2012) 10592-10606—each incorporated herein by reference in its entirety), graphene (Seger B and Kamat P V., J. Phys. Chem. C (2009); 113(19): 7990-95—incorporated herein by reference in its entirety), metal carbides (Dong J H and Jae S L., Energies 2009; 2(4): 873-899—incorporated herein by reference in its entirety) among others.

Amongst the above support materials, ordered mesoporous carbons (OMCs) have found a wide range of potential applications due to their uniform pore structure, large pore volumes, high surface areas, superior electrical conductivity and good chemical stability (Zhang, Chun He, Jiang, Rao and Shi-Gang Sun, Electrochem. Commun. 25(2012) 105-108; J. Zeng, C. Francia, C. Gerbaldi, V. Baglio, S. Specchia, A. S. Aricò, P. Spinelli., Electrochim. Acta 94(2013) 80-91; Sang H Joo, Seong J C, Ilwhan O, Juhyoun K, Zheng L, Osamu T & Ryong R., Nature 412(2001) 169-172; Sang Hoon Joo, Chanho P, Dae J Y, Seol-Ah L, Hyung I L, Ji M K, Hyuk C, Doyoung S., Electrochim. Acta 52(2006) 1618-1626; Zhi-Peng Sun, Xiao G Z, Hao Tong, Yan Y L, Hu L L., J. Colloid and Interf. Sci. 337(2009) 614-618; Juqin Zeng, Carlotta F, Mihaela A. D, Alessandro H. A. M V, Vijaykumar S. I, Stefania S, and Paolo S., Ind. Engg. Chem. Res. 51(2012) 7500-7509; Chuntao L, Meng C, Chunyu D, Jing Z, Geping Y, Pengfei S and Yongrong Sun., Int. J. Electrochem. Sci. 7(2012) 10592-10606—each incorporated herein by reference in its entirety). When a suitable noble metal was deposited on OMCs, the resultant electrocatalysts showed excellent performances on methanol oxidations in a methanol fuel cell (J. Zeng, C. Francia, C. Gerbaldi, V. Baglio, S. Specchia, A. S. Aricò, P. Spinelli., Electrochim. Acta 94(2013) 80-91; Sang H Joo, Seong J C, Ilwhan O, Juhyoun K, Zheng L, Osamu T & Ryong R., Nature 412(2001) 169-172—incorporated herein by reference in its entirety). It has also been used as a support in a Pt-based electrocatalyst for formic acid fuel cell (Chuntao L, Meng C, Chunyu D, Jing Z, Geping Y, Pengfei S and Yongrong Sun., Int. J. Electrochem. Sci. 7(2012) 10592-10606—incorporated herein by reference in its entirety).

The modification of the ordered mesoporous carbon support material is also found beneficial to improve the activity of supported catalysts. Partially filled d- or f-orbital of the transition metals allow them to switch between valences. Metal oxide-carbon composites have been extensively investigated as support material for methanol oxidation electrocatalysts (W L Qu, Z B Wang, X L Sui, D M Gu, G P Yin, Fuel Cells 2013; 13 (2): 149-157; Yang L Jun, Su Neng, Ting and Shi Jun, Sci China Chem. 55(2012) 391-397; J. Zeng, C. Francia, C. Gerbaldi, V. Baglio, S. Specchia, A. S. Aricò, P. Spinelli., Electrochim. Acta 94(2013) 80-91; Min K J, Jung Y W, Ki R L, Seong I W., Electrochem. Commun. 9(2007) 2163-2166; Gumaa El-Nagar, Ahmad M. Mohammad, El-Deab and El-Anadouli, Electrochim. Acta 94(2013) 62-71; Hao An, Cui, Zhou and Dejing Tao, Electrochim. Acta 92 (2013) 176-182—each incorporated herein by reference in its entirety). These studies showed that the addition of metal oxide improves both the activity and stability of the catalysts. There are other reports discussing the modification effects of $NiO$, $WO_3$ and $CeO_2$ on Pd/Pt-C for FAO (Yang L Jun, Su Neng, Ting and Shi Jun, Sci China Chem. 55(2012) 391-397; J. Zeng, C. Francia, C. Gerbaldi, V. Baglio, S. Specchia, A. S. Aricò, P. Spinelli., Electrochim. Acta 94(2013) 80-91; Gumaa El-Nagar, Ahmad M. Mohammad, El-Deab and El-Anadouli, Electrochim. Acta 94(2013) 62-71—each incorporated herein by reference in its entirety). In general, the addition of the transition metal oxides improves the overall performance of the carbon supported Pd-based electrocatalysts.

To achieve the highest attainable electrocatalytic activity of catalyst, OMC support with uniform pore structure, large mesopores volume and high specific surface area is modified with metal oxide ($WO_3$) nanoparticles (Zhang, Chun He, Jiang, Rao and Shi-Gang Sun, Electrochem. Commun. 25(2012) 105-108; J. Zeng, C. Francia, C. Gerbaldi, V. Baglio, S. Specchia, A. S. Aricò, P. Spinelli., Electrochim. Acta 94(2013) 80-91; Sang H Joo, Seong J C, Ilwhan O, Juhyoun K, Zheng L, Osamu T and Ryong R., Nature 412(2001) 169-172; Sang Hoon Joo, Chanho P, Dae J Y, Seol-Ah L, Hyung I L, Ji M K, Hyuk C, Doyoung S., Electrochim. Acta 52(2006) 1618-1626; Zhi-Peng Sun, Xiao G Z, Hao Tong, Yan Y L, Hu L L., J. Colloid and Interf. Sci. 337(2009) 614-618; Juqin Zeng, Carlotta F, Mihaela A. D, Alessandro H. A. M V, Vijaykumar S. I, Stefania S, and Paolo S., Ind. Engg. Chem. Res. 51(2012) 7500-7509; Chuntao L, Meng C, Chunyu D, Jing Z, Geping Y, Pengfei S and Yongrong Sun., Int. J. Electrochem. Sci. 7(2012) 10592-10606—each incorporated herein by reference in its entirety). Previous studies showed that commonly used modifiers such as $TiO_2$, $WO_3$, $CeO_2$, $ZrO_2$, NiO, and $Fe_2O_3$ are found beneficial to improve the activity of supported catalysts (W L Qu, Z B Wang, X L Sui, D M Gu, G P Yin, Fuel Cells 2013; 13 (2): 149-157; Yang L Jun, Su Neng, Ting and Shi Jun, Sci China Chem. 55(2012) 391-397; J. Zeng, C. Francia, C. Gerbaldi, V. Baglio, S. Specchia, A. S. Aricò, P. Spinelli., Electrochim. Acta 94(2013) 80-91; Min K J, Jung Y W, Ki R L, Seong I W., Electrochem. Commun. 9(2007) 2163-2166; Gumaa El-Nagar, Ahmad M. Mohammad, El-Deab and El-Anadouli, Electrochim. Acta 94(2013) 62-71; Hao An, Cui, Zhou and Dejing Tao, Electrochim. Acta 92 (2013) 176-182—each incorporated herein by reference in its entirety). Particularly, tungsten trioxide ($WO_3$) showed promising characteristics as a support modifier for formic acid (K. Y. Chen, P. K. Shen, A. C. C., Electrochem. Soc. 142 (1995) L54-L56; Z. H. Zhang, Y. J. Huang, J. J. Ge, C. P. Liu, T. H. Lu, W. Xing. Electrochem. Commun. 10 (2008) 1113-1116—each incorporated herein by reference in its entirety) and methanol fuel cell (S. Sharma, B. G. Pollet, J. Power Sources 208 (2012) 96; E. Antolini, E. R. Gonzalez, Appl. Catal. B: Environ. 96 (2010) 245; A. S. Aricò, V. Baglio, V. Antonucci, Direct methanol fuel cells: history, status and perspectives, in: H. Liu, J. Zhang (Eds.), Electrocatalysis of Direct Methanol Fuel Cells, Wiley-VCH Verlag GmbH & Co. KGaA, Weinheim, 2009, p. 1 (Chapter 1); P. K. Shen, A. C. C. Tseung, Electrochem. Soc. 141 (1994) 3082—each incorporated herein by reference in its entirety) electro-oxidation. Zhang et al. reported that Pd nanoparticles deposited on hybrid $WO_3$ support displayed high electro-oxidation activity for formic acid. Feng et al. (reported improved performance of formic acid oxidation using a $WO_3$/C hybrid support for a Pd based electrocatalysts (L Feng, L Yan, Z Cui, C Liu and Wei Xing., J. Power Sources 196(5) (2011) 2469-2474—incorporated herein by reference in its entirety). In the above catalysts, $WO_3$ acts both as a support modifier and promoter of the noble metals (Zhang, Y. J. Huang, J. J. Ge, C. P. Liu, T. H. Lu, W. Xing. Electrochem. Commun. 10 (2008) 1113-1116—incorporated herein by reference in its entirety). It is reported that $WO_3$ facilitates the formation of hydrogen bronze ($H_xWO_3$), which enhances the rate of dehydrogenation during oxidation in acidic medium (B. S. Hobbs, A. C. C. Tseung., Nature 222 (1969) 556-558—incorporated herein by reference in its entirety). The oxophilic nature of $WO_3$ helps removing the adsorbed CO intermediates from the Pt metal surface during the oxidation steps (A. C. C. Tseung, K. Y. Chen., Catalysis Today 38 (1997) 439-443—incorporated herein by reference in its entirety). The presence of $WO_3$ can also create a barrier phase between the support and the active noble metals slowing down the catalyst deactivation as occurs due to active metal particle agglomeration. Thus tungsten oxide can play an important role in further improvement of the commercially available carbon black supported catalysts improving both the catalytic performance and CO tolerance for fuel cell anodic catalyst electrodes (Hao An, Cui, Zhou and Dejing Tao, Electrochim. Acta 92(2013) 176-182—incorporated herein by reference in its entirety). To the best knowledge of the applicants, there are only few reports available in the open literature on the use of $WO_3$-OMC hybrid material as a catalyst support for the electro-oxidation.

In view of the foregoing, the need for improvements in $WO_3$-modified OMC as support material for Pd/Pt-based electrocatalyst for formic acid oxidation in DFAFCs and the need for improvement to Pd/Pt-based electrocatalyst for formic acid oxidation can readily be appreciated.

BRIEF SUMMARY OF THE INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings.

In a first aspect, the present invention provides an electrocatalyst for a fuel cell electrode comprising Pd as a first catalytic metal, Pt as a second catalytic metal and mesoporous carbon comprising $WO_3$ as catalyst support material. Pd and Pt are present in a ratio of x:y, x>y and x and y are optionally independently 1, 2 or 3. Pd and Pt are disposed in the mesopores of the mesoporous carbon in the electrocatalyst.

In a preferred embodiment, Pd, Pt, $WO_3$ and mesoporous carbon in the electrocatalyst are nanoparticles. Pd and Pt are present in an amount of no greater than 30% of the total weight of the catalyst.

In one embodiment, the electrocatalyst catalyzes the oxidation of formic acid to form $CO_2$.

In a second aspect, the present invention provides a direct formic acid fuel cell (DFAFC) comprising an anode comprising a catalyst comprising particles of Pd or Pt or both, a cathode, an electrolyte disposed between the anode and the cathode, a formic acid solution in contact with the anode and a solution comprising at least one oxidizing agent in contact with the cathode.

The anode catalyst of the fuel cell anode further comprises a carbon support, wherein the carbon support can be chosen from carbon black, ordered or disordered carbon nanotubes, ordered or disordered carbon nanofibers, ordered or disordered mesoporous carbon, graphene, metal carbides and silicon carbide. A preferred embodiment of the carbon support is ordered mesoporous carbon (OMC).

The carbon support may be modified a metal oxide, such as $TiO_2$, $WO_3$, $CeO_2$, $ZrO_2$, NiO, and $Fe_2O_3$. In a preferred embodiment, the metal oxide is $WO_3$.

Different ratios of Pd:Pt in the anode catalyst and the effects on the physical and chemical properties of the variations are also disclosed. The effects of the $WO_3$ modification of the OMC support are also explored through these characterizations. In general, the $WO_3$ modification is found to enhance the uniformed Pd and Pt dispersion on the OMC surface, increase the electrocatalytic activities and long-term stability of the anode catalyst for formic acid oxidation and minimize CO poisoning effects on the catalyst.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 7b is an enlargement of the CO oxidation peaks in FIG. 7a.

DETAILED DESCRIPTION OF THE EMBODIMENTS

Figure 1:
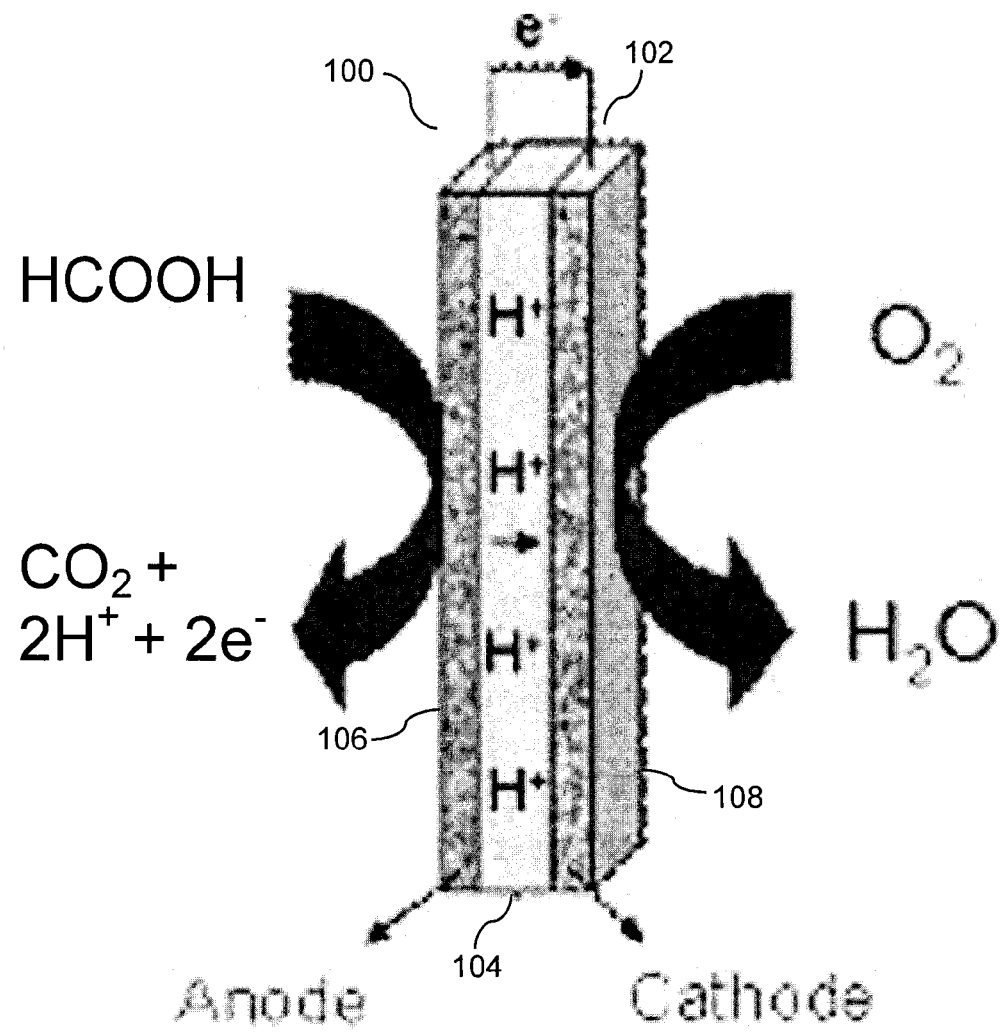
FIG. 1 illustrates an embodiment of a direct formic acid fuel cell (DFAFC) incorporating a $Pd_xPt_y/WO_3$-OMC or $Pd_xPt_y$/OMC according to the present invention as the anode electrocatalyst.

Referring now to the drawings, wherein like reference numerals designate identical or corresponding parts throughout the several views.

The present invention is directed to Pd and/or Pt-based electrocatalysts for formic acid oxidation in direct formic acid fuel cells (DFAFCs).

For purposes of the present invention, a DFAFC is a subtype of proton exchange membrane or polymer electrolyte membrane fuel cell (PEMFC). PEMFCs operate on a relatively simple principle of extracting protons and electrons from hydrogen atoms.

At the anode, hydrogen is broken down to yield a single proton and single electron. The source of the hydrogen for this step is what determines the subtype of PEMFC. For example, formic acid is used in formic fuel cells while hydrogen derived from methanol is used in methanol fuel cells (whether direct or indirect). After the proton and electron are separated, the proton is free to travel through the polymer electrolyte membrane (PEM). The PEM may be made of polymeric materials and acids such as perfluorosulfonic acid, which acts as the electrolyte in these fuel cells. The proton moves to the cathode side of the fuel cell, leaving the electron behind. The electron is unable to cross the PEM and as a result cannot reach the cathode, which is now positively charged due to the migration of protons through the PEM. This difference in charges sets up an electrochemical gradient, which is commonly referred to as a voltage.

Once an external circuit is created, the voltage is then leveraged to move electrons through the circuit to the cathode. Precious metals such as palladium and platinum are often used to catalyze the redox reactions at the electrodes, so that PEMFCs can operate at relatively low temperatures (less than 40° C. to 250° C.).

For purposes of the present invention, in a DFAFC, the fuel, formic acid, is fed directly to the fuel cell, thus removing the need for complicated catalytic reforming of the fuel.

For purposes of the present invention, "catalyst" and "electrocatalyst" are used interchangeably to refer to a catalyst in a fuel cell.

In one embodiment, the electrocatalyst may consist essentially of Pd particles.

In one embodiment, the electrocatalyst may consist essentially of Pt particles.

In another preferred embodiment, the catalyst may be bimetallic, containing a combination of Pt and Pd particles optionally at a specific ratio of x:y, wherein x is preferably greater than y. In some embodiments, the Pd:Pt ratio may be 1:1, 1:2, 1:3, 3:1 or 2:1.

In one embodiment, the Pd and Pt particles are nanoparticles, with an average particle diameter of 1-10 nm, preferably no greater than 5 nm, and preferably having an average particle diameter of from 2 to 4 nm. In other embodiments the Pd and Pt nanoparticles have a particle size distribution such that more than 95%, preferably more than 98% or more than 99% of the particles have a particle size of less than 10 nm.

In some embodiments, disclosed electrocatalysts further include a carbon support material. Examples of the carbon support material include carbon black, ordered or disordered carbon nanotubes, ordered or disordered carbon nanofibers, ordered or disordered mesoporous carbon, graphene, metal carbides, silicon carbide. In one embodiment, the carbon support material is ordered mesoporous carbon (OMC).

In certain embodiments, the OMC may be modified with a metal oxide, for example, TiO$_2$, WO$_3$, CeO$_2$, ZrO$_2$, NiO, and Fe$_2$O$_3$. In one embodiment, WO$_3$ is the modifier.

For purposes of the present invention, a "mesoporous material" is a material containing pores with diameters between 2 and 50 nm. "Microporous materials" have pore diameters of less than 2 nm. "Macroporous materials" have pore diameters of greater than 50 nm.

According to the present invention, both the unmodified and WO$_3$-OMC may have a BET specific surface area of 750-1500 m$^2$g$^{-1}$, preferably 800-1000 in$^2$g$^1$, a most preferable pore size of 2-8 nm, preferably 3-4 nm, a pore volume of 0.4-3.2 cm$^3$g$^{-1}$, preferably 1.0-1.5 cm$^3$g$^{-1}$. The OMC may be commercially available (for example, a trade name of CMK-1 or CMK-3, as a commercially available OMC having an ordered pore structure), or may be produced by a known process (for example, reference can be made according to Journal of Materials Chemistry, Vol. 19, 2009, pp. 7759-7764—incorporated herein by reference in its entirety).

There is no special limitation as to the particle size of the mesoporous carbon, as long as it meets with the requirements as set for a carrier in a catalyst. For example, the particle size could be, but not limited to, 10 to 10000 nm, or 10 to 1000 nm, or 10 to 100 nm. When the mesoporous carbon is of a non-spherical shape, a person skilled in the art will recognize that the particle size refers to the size of long axis or length.

In a preferred embodiment, the disclosed catalyst is a nanocatalyst, wherein all catalytic, non-catalytic, metal and non-metal particles used are nanoparticles.

The present invention also provides methods of forming OMC. A preferred method involves the initial formation of a silica template or precursor with ordered mesoporous silica. Examples of ordered mesoporous silica include but are not limited to SBA-15, TUD-1, MCM-41, HMM-33 and FSM-16. In one embodiment, the present invention further provides methods of synthesizing ordered mesoporous silica templates. For example, SBA-15 may be prepared by polymerization of TEOS using the hard template method. OMC is then synthesized via carbonization of sucrose mesopores of SBA-15 followed by the hydrofluoric acid (HF) treatment to remove the unconverted silica traces completely.

Preferably, the synthesized SBA-15 is modified with $WO_3$. The SBA-15 may be modified by wetness impregnation method using $H_3PW_{12}O_{40}H_2O$ as tungsten precursor to produce the intermediate $WO_3$-SBA-15 prior to the synthesis of $WO_3$-OMC.

Methods also include preparation of OMC or $WO_3$-OMC supported Pd and/or Pt-based electrocatalysts. In one embodiment, the amount of OMC may be 65-99 wt. % of the catalyst, preferably 75-85 wt. %. The amount of W may be 5-15 wt. % of the catalyst, preferably 7-10 wt. %. OMC and $WO_3$ amounts remain constant while Pd and Pt amounts may vary. Methods of loading the catalytic metals onto the OMC or $WO_3$-OMC support include direct doping, wet impregnation, hydrolysis impregnation and chemical vapor deposition (CVD).

Dispersion may be improved, for example, through improved nanoparticle preparation methods to prevent particle agglomeration and/or reduce nanoparticle size. In synthesis methods of the present invention, Pd and Pt nanoparticles are prepared by dissolving a metal salt in solution and adding a reducing agent, such as $NaBH_4$, which reduces $Pd^{2+}$) to Pd metal nanoparticles. Pd and Pt metal precursors may also be solvated in water with ethylene glycol and metals may be reduced at a temperature of 300-400° C. under 7% $H_2/N_2$ or 4% $H_2/Ar$ gas flow (Xiulei J, Tae L, Reanne H. Lei Z, Jiujun Z, Gianluig A. B, Martin C. and Linda F. N. Nature Chemistry 4(2010): 286-293; Jongmin S., Jaehyuk L., Youngjin Y., Jongkook H., Soo-Kil K., Tae-Hoon L, Ulrich W. and Jinwoo L. ACS Nano 6(2012) 6870-6881—each incorporated herein by reference in its entirety). Pd and/or Pt nanoparticles are then loaded upon the OMC or $WO_3$-OMC support. The size of the Pd and Pt nanoparticles will depend upon the strength of the reducing agent, the solvents used, the temperature, the stabilizing polymers used, etc. Once the nanoparticles are formed they typically have a surface charge on them.

The dispersion increases quickly as the particle size shrinks. To achieve increased activity, other catalysts of the invention will have substantially all of the Pd and Pt nanoparticles of a size less than about 10 nm, and still other catalysts of the invention with substantially all Pd and Pt nanoparticles of a size less than about 5 nm. Exemplary catalysts of the invention having Pd and Pt particle sizes of about 2 nm will result in a dispersion of 25-30% and exemplary catalysts with a Pd/Pt particle size of about 1.2-1.5 nm will achieve dispersions of greater than 50%. Therefore, Pd and Pt nanoparticles have a dispersion of 25-60%, preferably 40-60%. Smaller particle sizes are also believed to improve binding energy of formic acid and hydrogen to the catalyst.

In one embodiment, the total amount of Pd and Pt may be 0-30 wt. % of the catalyst, preferably 5-25 wt. %, 10-20 wt. %, or about 15 wt. %.

In another embodiment, the amount of Pd may be 0-15 wt. % of the catalyst, preferably 2-12 wt. %, 5-10 wt. %, or 7-8 wt. %.

In yet another embodiment, the amount of Pt may be 0-15 wt. % of the catalyst, preferably 2-12 wt. %, 5-10 wt. % or 7-8 wt. %.

Methods provided herein further include methods of characterizing the physical and electrochemical properties of the synthesized catalysts. Physical properties such as morphology, structural properties, compositions of the PdPt/$WO_3$-OMC catalysts may be characterized using different techniques including scanning electron microscopy (SEM), thermo gravimetric analysis (TGA), X-ray diffraction (XRD), transmission electron microscopy (TEM), $N_2$ adsorption/desorption isotherm, energy dispersive X-ray spectroscopy (EDX).

It is noted that Pd- and Pt-based catalysts when used with formic acid fuel cells can become poisoned over time and thereby show some decreased activity. It is suspected that OH or other poisoning species may become bound to catalytic sites, thereby making them unavailable for future catalytic activity. Addition of certain metals may prevent or reduce the poisoning. When a carbon support material is used for Pd- and Pt-based catalysts, the metals in their oxidized form may be incorporated within the support material. Therefore, electrochemical active surface area (ECAS) and CO poisoning resistance of the catalyst samples as well as the effects of $WO_3$ addition may be determined by CO stripping voltammetry. In one embodiment, the synthesized electrocatalysts with $WO_3$-modified OMC support have an ECAS of at least 60 $m^2/g$ metal, preferably 30-70 $m^2/g$ metal or 40-60 $m^2/g$ metal.

Also, it has been discovered that the poisoning effects can be largely reversed and the poisoning species removed through application of high potential. Thus, for example, it may be useful when operating a formic acid fuel cell of the invention with a Pd/Pt catalyst to intermittently apply a high potential to "clean" the catalysts of poisoning species.

Electrochemical characterizations of the catalysts may also include determination of formic acid oxidation (FAO) activity, catalytic activity and stability. FAO of the $WO_3$-modified OMC-supported electrocatalysts may be established via cyclicvolammetry (CV) analysis. Chronoamperometry analysis may be employed to study the catalytic activity and stability of the various embodiments of the $WO_3$-modified OMC-supported Pd- and/or Pt-based electrocatalysts towards HCOOH electro-oxidation.

In one embodiment, a $WO_3$-modified OMC-supported electrocatalyst may display a current density of 10-80 $mA/cm^2$, preferably 50-80 $mA/cm^2$ and a maximum current of 10-70 $mA/cm^2$, preferably 30-60 $mA/cm^2$. Power outputs of up to 50 $mW/cm^2$, preferably 15-30 $mW/cm^2$, may be produced by a DFAFC incorporating a $WO_3$-modified OMC-supported electrocatalyst according to the present invention.

Additionally, the present invention relates to a direct formic acid fuel cell (DFAFC) having a $Pd_xPt_y/WO_3$-OMC, wherein x and y are preferably up to 3, and optionally independently=0, 1, 2, 3 and x is preferably greater than y. As shown in FIG. 1, DFAFC 100 includes a membrane electrode assembly (MEA) 102. MEA 102 includes a polymer electrolyte membrane (PEM) membrane 104 saturated with at least 18.0 wt. % of the total PEM membrane weight, preferably 0.40-0.60 wt. %. The PEM membrane 104 is flanked by an anode catalyst layer 106 disposed on a first surface of the MEA and a cathode catalyst layer 108 disposed on a second surface of the MEA. A $Pd_xPt_y/WO_3$-OMC or $Pd_xPt_y$/OMC electrocatalyst according to the present invention may be used as the anode catalyst layer, where formic acid of concentrations up to 15M (preferably 5-12 M) may be oxidized. Protons ($H^+$) produced during the oxidation are passed through the PEM membrane to react with oxygen on the cathode catalyst layer located on a second surface of the PEM membrane. Electrons produced during the oxidation of formic acid are passed through an external circuit from anode to cathode to provide power to an external device. Oxygen is reduced to water at the cathode.

The oxidation reaction (formic acid oxidation) that occurs at anode catalyst layer 106 is:

$$HCOOH \rightarrow CO_2 + 2H^+ + 2e^-$$

At cathode catalyst layer 108, the reduction reaction is as follows:

$$O_2 + 2H^+ + 2e^- \rightarrow H_2O$$

In one embodiment, a solid polymer electrolyte such as the PEM membrane may be responsible for the selective conduction of protons, separation of product gases and electrical insulation of the electrodes. PEM membranes may be constructed of either polymer membranes or composite membranes where other materials are embedded in a polymer matrix. Examples of PEM materials include but are not limited to PFSA fluoropolymer, Nafion®, polyethyleneimine (PEI)/SiO2 with amine/trifluoromethanesulfonimide (HTFSI).

In one embodiment, conventional electrolyte solutions may be used. Electrolyte solutions may contain ions such as $Na^+$, $K^+$, $Ca^{2+}$, $Mg^{2+}$, $Cl^-$, $HPO_4^{2-}$ and $HCO_3^-$. The anode and cathode catalysts may be in electrode form. Electrolyte solutions may also be acidic (e.g. sulfuric, hydrochloride acids) or basic (e.g. sodium hydroxide, potassium hydroxide).

In one embodiment, a DFAFC described herein may further comprise a housing or a casing. Constructive materials for the housing or casing include, for example, non-conductive polymeric organic materials and are selected from the group consisting of liquid crystal materials, self-assembling materials, polyacrylates, polymethacrylates, poly($C_1$-$C_{12}$ alkyl methacrylates). polyoxy(alkylene methacrylates), poly(alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), thermoplastic polycarbonates, polyesters, polyamide, polyimide, polyurethane, poly(urea)urethane, polythiourethane, polythio(urea)urethane, polycyclic alkene, polyurethanes, poly(ethylene terephthalate), polyolefin, polystyrene, poly(alpha methylstyrene), copoly(styrene-methylmethacrylate), copoly(styrene acrylonitnile), polyvinylbutyral and polymers of members of the group consisting of polyol(allyl carbonate) monomers, polyfunctional acrylate monomers, polyfunctional methacrylate monomers, diethylene glycol dimethacrylate monomers, diisopropenyl benzene monomers, alkoxylated polyhydric alcohol acrylate monomers and diallylidene pentaerythritol monomers, copolymers thereof, and/or mixtures thereof.

Applications of the described DFAFC include small, portable electronic devices such as phones, digital cameras and laptop computers.

An exemplary fuel cell membrane electrode assembly of the invention is linked to a capacitor or other charge storage device so that a sufficiently high potential may be applied from time to time to clean the Pd/Pt catalyst. A portion of the energy generated by an exemplary fuel cell of the invention may be used to charge the capacitor or other storage device over a period of 30 min or so, for example, with the charge from the capacitor then applied to clean the Pd/Pt catalyst.

In one embodiment, the fuel cell described herein may have a stable working temperature of 25-100° C. preferably 25-60° C. Currents of up to 150 mA/cm², preferably 100-130 mA/cm² and power outputs of up to 60.0 mW/cm², preferably 40.0-50.0 mW/cm² may be produced by the fuel at open circuit potentials of 0.60-0.80 V, preferably 0.65-0.72 V.

The examples below are intended to further illustrate protocols for assessing the methods and catalysts described herein, and are not intended to limit the scope of the claims.

EXAMPLE 1

Chemicals

Phosphotungstic acid hydrate ($H_3PW_{12}O_{40} \cdot H_2O$, 99.9%), Palladium nitrate dihydrate ($Pd(NO_3)_2 \cdot 2H_2O$, 40 wt. % Pd), hexachloro Platinic acid hexahydrate ($H_2(PtCl_6) \cdot 6H_2O$, 40 wt. %), and Sodium borohydrite ($NaBH_4$) were purchased from MERCK. TEOS ($Si(OC_2H_5)_4$ 99 wt. %), sucrose ($C_{12}H_{22}O_{11}$, 98 wt. %) were purchased from LOBA Chemical (Pvt) Ltd. Hydrofluoric acid (HF, 40 wt. %), sulfuric acid ($H_2SO_4$, 97-98 wt. %), formic acid (HCOOH, 95 wt. %), ethanol ($C_2H_5OH$, 99.8 wt. %), hydrochloric acid (HCl, 37 wt. %) and Nafion resin (5 wt. % solution in aliphatic alcohols and water) were purchased from Sigma Aldrich. Millipore water was used for the preparation of all aqueous solutions.

EXAMPLE 2

There were three major steps involved in the preparation of the supported electrocatalysts for this study. In the first step, SBA-15 was prepared by polymerization of TEOS using hard template method. In the second step, the $WO_3$ modified $WO_3$-OMC support was synthesized by carbonization of sucrose followed by the hydrofluoric acid (HF) treatment to remove the unconverted silica traces completely. In the third and final step, Pd and Pt were loaded on the $WO_3$-OMC support using a borohydride reduction method. The details of the above three steps are presented in the following subsections.

EXAMPLE 3

Synthesis of $WO_3$-SBA-15

The SBA-15 silica sample was synthesized by a hard-template TEOS polymerization method as reported by Zhao et al. (Dongyuan Z, Jianglin F, Qisheng H, Nicholas M, Glenn H F, Bradley F C, Galen D S., Science 279(1998) 548-552—incorporated herein by reference in its entirety) and Jun et al. (Shinae J, Sang H J, Ryong R, Michal K, Mietek J, Zheng L, Tetsu O and Osamu T., J. Am. Chem. Soc. 122(2000) 10712-10713—incorporated herein by reference in its entirety) with slight variations. The prepared SBA-15 was then modified with $WO_3$ by wetness impregnation method using $H_3PW_{12}O_{40}H_2O$ as tungsten precursor. Phosphotungstic acid (PWA) hydrate solution was prepared in deionized water under starring at room temperature for 30 min. The solution was added to desired amount of preheated SBA-15 at 110° C. The resultant suspension was ultra sonicated for 24 h at room temperature and then dried at 100° C. to remove the water completely. Finally, the sample was calcinated at 450° C. under argon flow for 4 h to thermally decompose PWA to $WO_3$.

EXAMPLE 4

Synthesis of Hybrid $WO_3$-OMC $WO_3$-OMC was prepared by carbonization of sucrose into mesopores of $WO_3$-SBA-15 as reported by Wang et al. (Lifeng Wang, Sen L, Kaifeng L, Chengyang Y, Desheng L, Yan Di, Peiwei F, Dazhen J and Feng S X., Micropor. Mesopor. Mat. 85(2005) 136-142—incorporated herein by reference in its entirety) with some modifications. In this method, 1.0 g of $WO_3$-SBA-15 was added to a solution containing 1.25 g of sucrose, 0.14 g of sulfuric acid and 5.0 g of deionized water. The mixture was then placed in an oven at 100° C. for 6 h, after that the oven temperature was increased to 160° C. at a heating rate of 2° C./min. The sample was kept at 160° C. for another 6 h. The above steps were repeated by adding 0.8 g of sucrose in order to fill the internal $WO_3$SBA-15 silica pores completely. The resultant material was pyrolyzed at 800° C. under $N_2$ flow for 6 h to obtain the carbon-silica composite. The composite was washed with 5 wt. % HF solution to remove the silica template. Finally, the sample was filtered, washed with deionized water and dried at 100° C. for 4 h. Later on TGA analysis confirmed the high temperature (25-400° C.) stability of support material.

EXAMPLE 5

Preparation of PdPt/$WO_3$-OMC Electrocatalysts

Bimetallic PdPt/$WO_3$-OMC electrocatalysts were prepared by borohydride reduction method using $NaBH_4$ as a reducing agent. In this technique, required amount of metal salts (Palladium nitrate and hexachloro Platinic acid), were drop wise added to $WO_3$-OMC support under constant vigorous stirring. The metal loaded $WO_3$-OMC support was then added to 200 ml deionized water and stirred it for 3 h to make a homogeneous suspension. Appropriate amount of sodium citrate solution was added to the suspension with vigorous stirring and allowed for further 1 h ultrasonication. Freshly prepared 120 mg (3 times molar ratio of active metals) $NaBH_4$ solution was slowly added to the suspension and set for another 12 h stirring to allow complete reduction of Pt and Pd salts at room temperature. The slurry was then centrifuged, washed with deionized water and dried at 110° C. for 4 h. In the final samples, total metal loading was 20 wt. % and the mass ratio of Pd to Pt was easily adjusted by using different amounts of Pt and Pd precursors.

EXAMPLE 6

Physical Characterizations of the Catalysts

Specific surface areas (BET) and pore volume of the synthesized materials/catalysts were determined by $N_2$ adsorption analysis using a Micromeritics model ASAP 2010 analyzer. Prior to the measurements, the samples were degassed at 250° C. under nitrogen flow for 6 h in order to remove moisture completely. Physical adsorption of $N_2$ was carried out in a liquid nitrogen bath maintaining 77 K temperature.

The XRD analysis was conducted to detect the crystalline phases of catalysts and measure their sizes. The XRD experiments were carried out using a Smart Lab (9 kW) Rigaku XRD X-ray diffraction X-ray diffractometer, with a diffraction angle range 2θ=5-80° using Cu Kα radiation with a scan rate of 6° $min^{-1}$.

The morphologies of the support and catalysts were studied by using a scanning electron microscope (JEOL JSM-6460LV) operated at 20 kV equipped with energy dispersive X-ray (EDX). EDX was carried to find out the composition of catalyst samples.

Transmission electron microscopy (TEM) images were taken to determine the metal dispersion on support material along with particle size of loaded metal. An ultra-high resolution FETEM (JEOL, JEM-2100F) at an accelerating voltage of 200 kV was employed to capture the images of the solid samples.

TGA was recorded on a Shimadzu TGA-60 between 25° C. and 800° C. at the default ramp rate of 10° C./min under dry air atmosphere for determination of oxidation temperature of support material.

EXAMPLE 7

Figure 2:
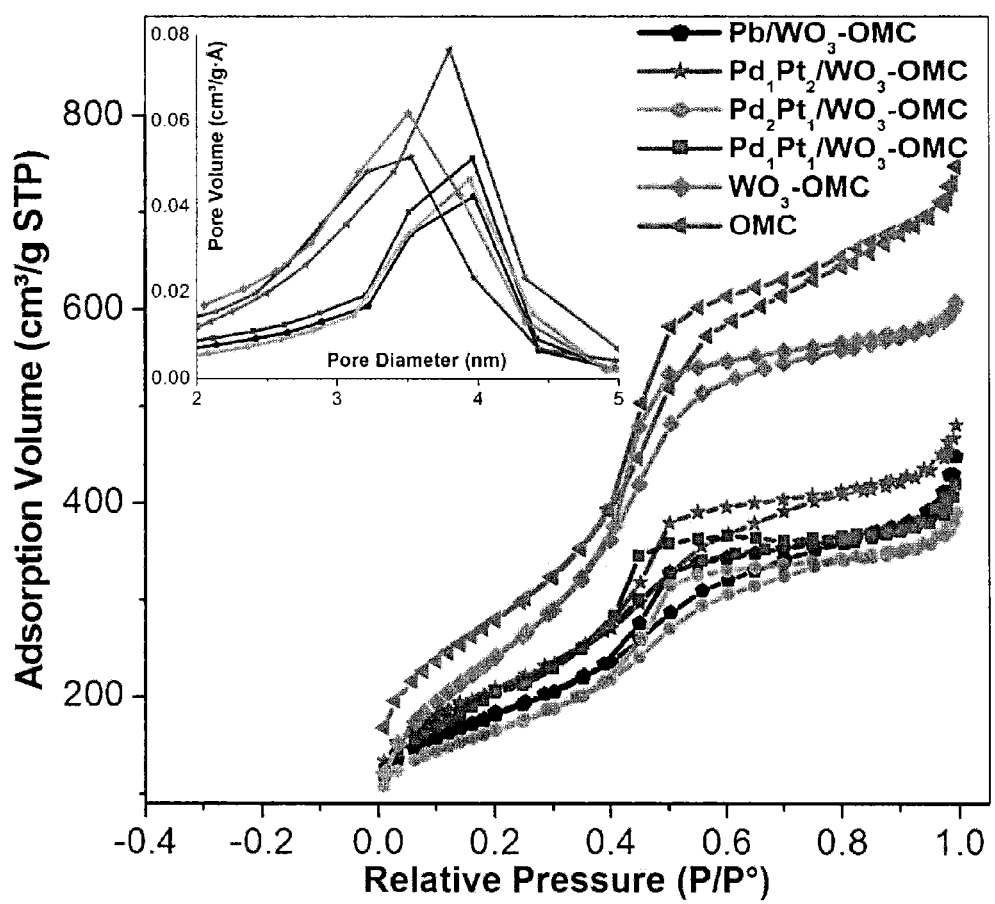
FIG. 2 illustrates N$_2$ adsorption-desorption isotherm and BJH pore size distribution of OMC, WO$_3$-OMC, Pd/WO$_3$-OMC, Pd$_1$Pt$_1$/WO$_3$-OMC, Pd$_2$Pt$_1$/WO$_3$-OMC and Pd$_1$Pt$_2$/WO$_3$-OMC.

$N_2$ Adsorption Isotherms $N_2$ adsorption-desorption isotherms and corresponding BJH (Barret-Joyner-Halenda) pore size distribution curves of the OMC, $WO_3$ modified OMC support and the prepared catalyst samples are shown in FIG. 2. All these isotherms contain following three common phases of adsorptions are evident: (i) monolayer adsorptions, (ii) multilayer adsorption and (iii) capillary condensation. OMC and $WO_3$-OMC samples exhibited a type IV isotherm with a slightly sharp capillary condensation step between $p/p_0$=0.42 and 0.95. This lower pressure capillary condensation indicates that OMC and $WO_3$-OMC support contains smaller average pore sizes. BET surface area, pore size and total volume of OMC and PdPt based catalysts were calculated from the nitrogen adsorption isotherm data and summarized in Table 1. The measured BET surface area of OMC 1005 $m^2/g$ is in agreement with material as reported by J. Zeng et al. (2013) (J. Zeng, C. Francia, C. Gerbaldi, V. Baglio, S. Specchia, A. S. Aricò, P. Spinelli., Electrochim. Acta 94(2013) 80-91—incorporated herein by reference in its entirety). After $WO_3$ modification, the specific surface area of the OMC decreased from 1005 $m^2/g$ to 861 $m^2/g$. The deposition of tungsten oxide inside the mesopores of OMC is mainly responsible for the decrease in the specific surface area of the $WO_3$-OMC sample. From BJH, pore size distribution curve it is observed that the pore size of all samples is consistently between 3 and 4 nm. The BJH pore size for OMC and $WO_3$-OMC is measured as 3.8 nm and 3.4 nm, respectively.

TABLE 1

Surface properties of OMC and $WO_3$-OMC catalysts samples.

| Sample | $S_{BET}$ ($m^2g^{-1}$) | $d_{BJH}$ (nm) | $V_{total}$ ($cm^3g^{-1}$) |
|---|---|---|---|
| OMC | 1005 | 3.8 | 1.23 |
| $WO_3$-OMC | 861 | 3.4 | 0.79 |
| Pd/$WO_3$-OMC | 577 | 4.1 | 0.68 |
| $Pd_1Pt_1$/$WO_3$-OMC | 629 | 3.9 | 0.66 |
| $Pd_2Pt_1$/$WO_3$-OMC | 646 | 3.8 | 0.67 |
| $Pd_1Pt_2$/$WO_3$-OMC | 721 | 3.5 | 0.69 |

EXAMPLE 8

XRD Analysis

Figure 3:
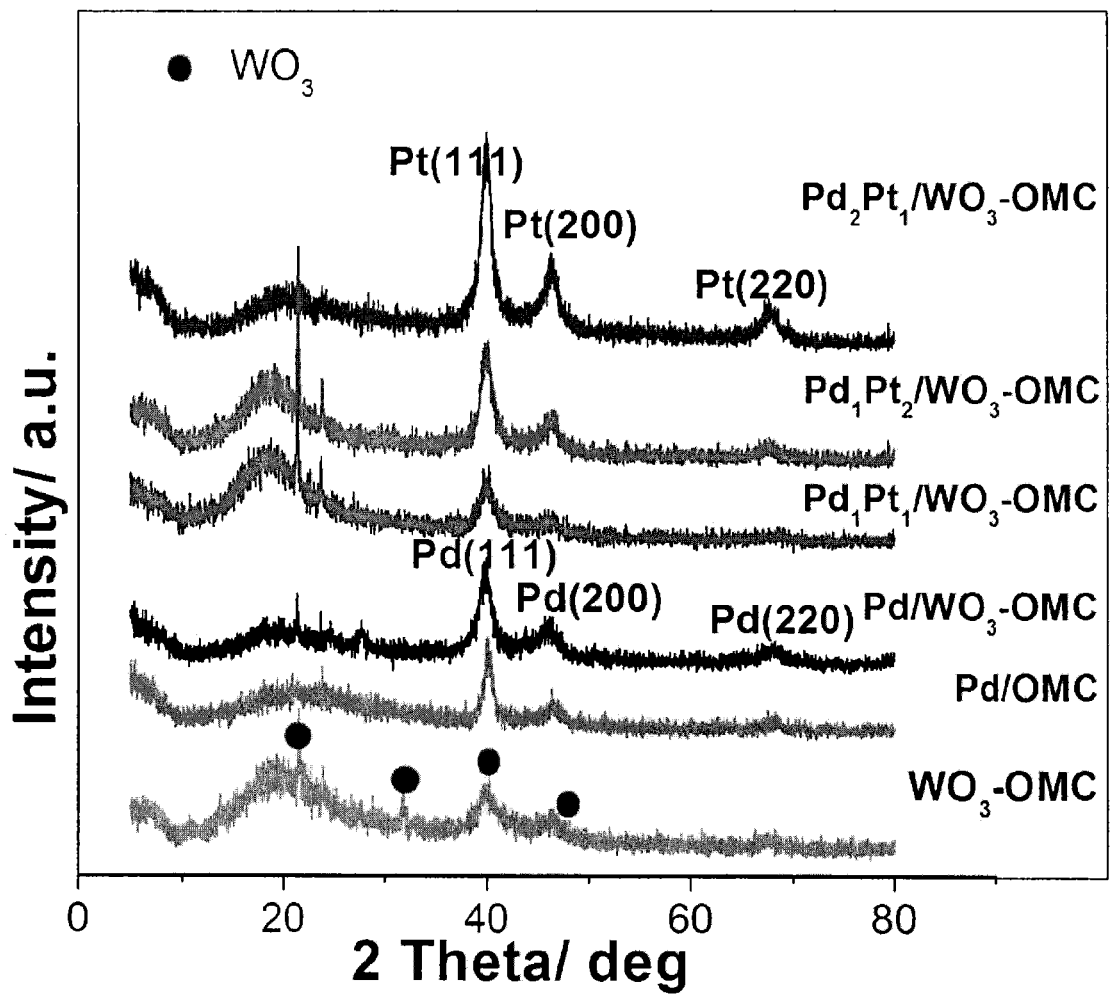
FIG. 3 is a graph illustrating wide angle XRD pattern of WO$_3$-OMC support, Pd/OMC and PdPt/WO$_3$-OMC catalysts with varying ratios of Pt and Pd.
Figure 4A:
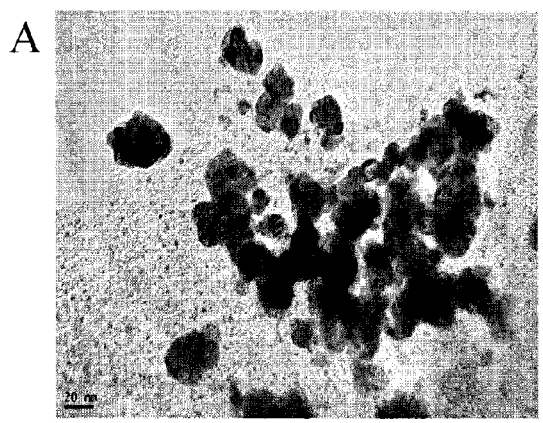
FIG. 4a is a TEM image of Pd/OMC.
Figure 4B:
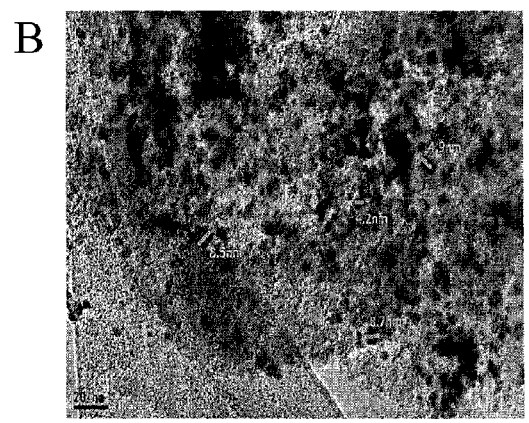
FIG. 4b is an image of Pd/WO$_3$-OMC.
Figure 4C:
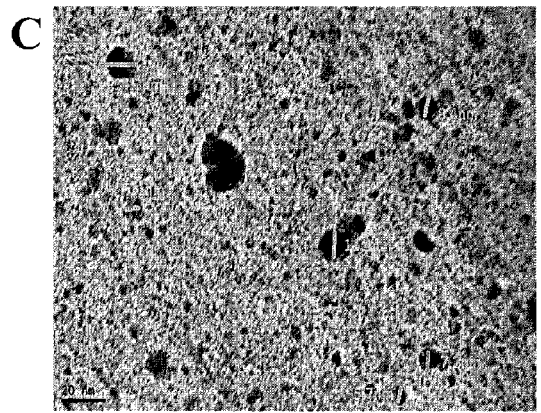
FIG. 4c is an image of Pd$_2$Pt$_1$/WO$_3$-OMC.
Figure 4D:
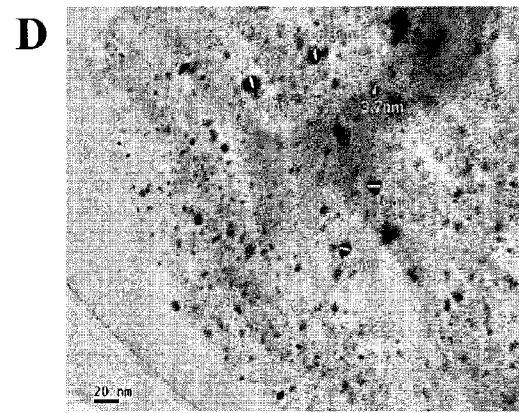
FIG. 4d is an image of Pd$_1$Pt$_2$/WO$_3$-OMC.

The crystalline structure of $WO_3$-OMC support and series of PdPt-based catalysts were determined by using X-ray diffraction technique and results are shown in FIG. 3. Catalysts with Pd to Pt ratios are denoted as $Pd_1Pt_1/WO_3$-OMC, $Pd_2Pt_1/WO_3$-OMC and $Pd_1Pt_2/WO_3$-OMC. In all samples, diffraction peak)(19.18° at 2θ corresponds to the (002) planes of the carbon support (Yang L Jun, Su Neng, Ting and Shi Jun, Sci China Chem. 55(2012) 391-397—incorporated herein by reference in its entirety). As can be seen from FIG. 3, the XRD patterns of both Pd and Pt are quite similar. For Pd/OMC, Pd/$WO_3$-OMC and PdPt/$WO_3$-OMC electrocatalysts, the peaks at 39.4°, 47.7° and 68° correspond to the (111), (200) and (220) planes of Pd, respectively, indicating the characteristics of face-centered cubic (fcc) crystalline structure of palladium nanoparticle's (JCPDS, Card No. 65-6174). The XRD patterns of both the $WO_3$-OMC and OMC supported catalysts show that the support modification and decreasing Pd content ratio has no prominent effects on diffraction peaks except making it broader and slightly moving the peaks to higher angle. In $Pd_1Pt_2/WO_3$-OMC catalyst, the XRD patterns showed similar Pt diffraction peaks at 40°, 47.9° and 69.3° angles corresponds to (111), (200) and (220), respectively. These observations are in line with what has been also reported by Z. P. Sun et al. (Zhi-Peng Sun, Xiao G Z, Hao Tong, Yan Y L, Hu L L., J. Colloid and Interf. Sci. 337(2009) 614-618—incorporated herein by reference in its entirety). Tungsten oxide appeared at 21.7°, 32.4°, 40.1° and 46.7° places, indexed to fcc-phase of tungsten (JCPDS card no. 20-1324) and indicating significant crystallite $WO_3$ framework growth. The crystalline size of Pd and Pt particles were calculated using Sherrer Equation for the Pd (111) peak (Juqin Zeng, Carlotta F, Mihaela A. D, Alessandro H. A. M V, Vijaykumar S. I, Stefania S, and Paolo S., Ind. Engg. Chem. Res. 51(2012) 7500-7509—incorporated herein by reference in its entirety).

$$d = \frac{0.9\,\lambda}{(\beta \, \text{Cos } \theta)}$$

Where d is the average particle size, λ, is the X-ray wave length 0.154 nm, θ is the diffraction angle of the Pd (111) peak and β is the peak broadening (FWHM). The crystallite size obtained for Pd/OMC, Pd/$WO_3$-OMC, $Pd_1Pt_1/WO_3$-OMC, $Pd_1Pt_2/WO_3$-OMC and $Pd_2Pt_1/WO_3$-OMC were found to be 6.7 nm, 6.5 nm, 6.2 nm, 6.6 nm and 6.0, respectively. It was noticed that the crystal size of samples decreased with the increase of Pd to Pt ratio in the catalyst. Also face centered cubic structures of $WO_3$ and PdPt bimetallic catalysts coexist in all samples.

EXAMPLE 9

TEM Analysis

TEM images of the $WO_3$ modified $WO_3$-OMC promoted catalysts samples in FIGS. 4a-4d show that noble metals are deposited as nano-sized crystals and are uniformly dispersed on the surface of $WO_3$-OMC support. Agglomeration of Pd particles on the surface of OMC support in FIG. 4a confirmed that modification of the OMC with $WO_3$ enhanced the dispersion of Pt and Pd metals (FIGS. 4b 4c and 4d) and increase of Pd to Pt ratios influence the formation of smaller size crystals on the surface. The average crystal size of Pd/$WO_3$-OMC, $Pd_1Pt_1/WO_3$-OMC, $Pd_2Pt_1/WO_3$-OMC and Pt/$WO_3$-OMC catalysts are found to be 7.2 nm, 6.9 nm, 6.7 nm and 6.2 nm, respectively. The measured crystal sizes are in good agreement with the values as calculated from Sherrer Equation using XRD data.

EXAMPLE 10

SEM-EDX Analysis

Figure 5A:
FIG. 5a is an SEM image of WO$_3$-OMC.
Figure 5B:
FIG. 5b is an SEM image of Pd$_2$Pt$_1$/WO$_3$-OMC.
Figure 5C:
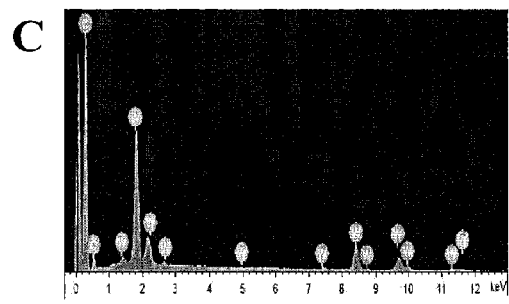
FIG. 5c is an EDX image of WO$_3$-OMC.
Figure 5D:
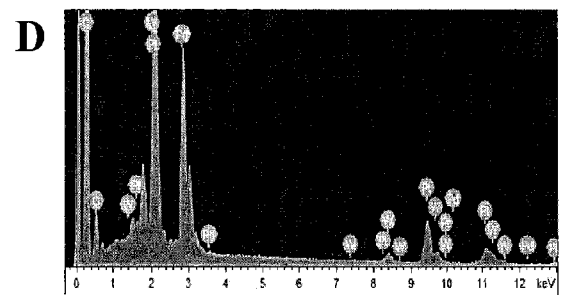
FIG. 5d is an EDX image of Pd$_2$Pt$_1$/WO$_3$-OMC.

FIGS. 5a-5d shows the morphology of synthesized support and electrocatalyst obtained by using scanning electron microscopy analysis. SEM images of FIGS. 5a-5d clearly elaborate the aggregated rope-like structure with smooth surfaces for $WO_3$-OMC support. The length of rope is estimated to be around 1-2 μm and broad interconnection between the ropes can be seen in FIG. 5a. Similarly, uniform Pt and Pd metal loading on support material is shown in FIG. 5b using $Pd_2Pt_1/WO_3$-OMC catalyst sample. By $WO_3$ modification, PdPt crystal sizes also appeared to be narrowly distributed. Within the resolution level of SEM, it is not possible to differentiate any significant changes in shape between support and catalyst material except length of rope reduced slightly in FIG. 5b.

The EDX images of $WO_3$-OMC and $Pd_2Pt_1/WO_3$-OMC samples (FIGS. 5c and 5d) reveal the presence of carbon, tungsten and other respective metals (Pd, Pt). The initial unknown peak represents the aluminum holder which is used in JEOL JSM-6460LV machine. The presence of metal elements such as Pd, Pt and W reveals the successful deposition of metals on mesoporous carbon.

EXAMPLE 11

TGA Analysis

Figure 6:
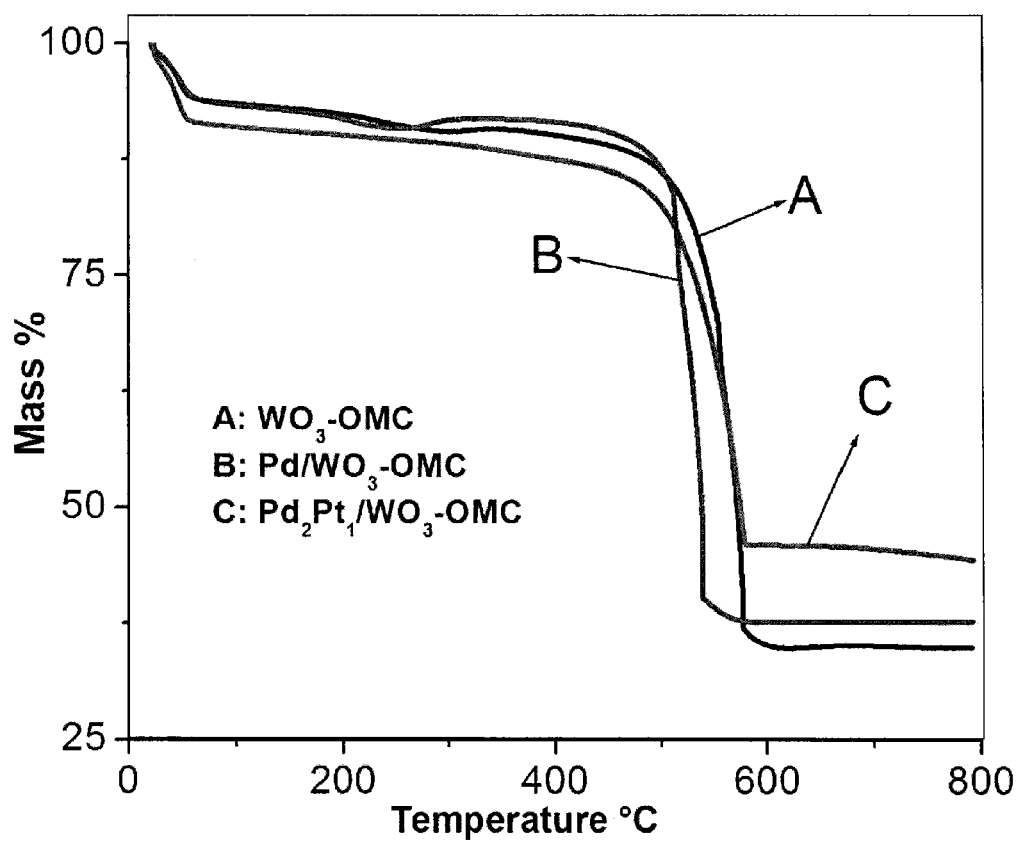
FIG. 6 illustrates TGA curves of (A) WO$_3$-OMC (B) Pd$_2$Pt$_1$/WO$_3$-OMC at 10° C./min.

TGA measurement is shown in FIG. 6 where temperature is plotted against mass % of $WO_3$-OMC support, Pd/$WO_3$-OMC and $Pd_2Pt_1/WO_3$-OMC catalysts in dry air atmosphere. To ensure complete evaporation of mesoporous carbon through oxidation, the final temperature was kept at 800° C. (Zhao H T, Gang W, Bing W and Ying G., J. Power Sources 164(2007) 105-110—incorporated herein by reference in its entirety). Thermal stability of OMC support was recorded between 25° C. to 460° C. range. Initial rapid mass reduction was the result of moisture evaporation, present in the samples. Due to the oxidation of OMC, the major weight loss is found from 496° C. to 610° C. for $WO_3$-OMC support, from 465° C. to 560° C. for Pd/$WO_3$-OMC and from 440° C. to 565° C. for $Pd_2Pt_1/WO_3$-OMC catalysts. The amount greater than 20 wt. % in catalysts showed the oxides formation of PdPt catalyst which may cause at 800° C. (Yang L Jun, Su Neng, Ting and Shi Jun, Sci China Chem. 55(2012) 391-397—incorporated herein by reference in its entirety). These observations confirm that actual and expected compositions are quite consistent.

EXAMPLE 12

Electrochemical Characterizations of the Catalysts

The electrochemical oxidation of formic acid was performed using a Biologic potentiostat (VMP3 Biologic Science Instruments, France.) at ambient temperature in a three electrode cell. A glassy carbon (3 mm diameter) covered with a thin layer of Nafion-impregnated catalyst (geometrical area of the electrode: 0.076 cm²) was used as the working electrode. A Pt-wire and an Ag/AgCl electrode (3.5 M KCl) were used as the counter and reference electrodes, respectively. All potentials reported as quoted versus the Ag/AgCl reference. At first 5 mg of electrocatalyst was dispersed in 1 mL of ethanol, 30 µL Nafion/aliphatic and water solution (5 wt. % Nafion) by sonication for 30 min to form a catalyst ink. 10 µL of this ink was transferred (by pipette) to the polished surface (Aluminum powder of 0.3 µ and 0.50 µ) of the glassy carbon. For all the experiments the metal loading on the working electrode was maintained at 0.127 mg metal/cm². CV data were recorded from −0.2 to 1.2 V (vs. Ag/AgCl) at a scan rate of 20 mV/s in 0.5 M $H_2SO_4$ solution with and without 0.5 M HCOOH. Chronoamperometry (CA) at 0.3 V (vs. Ag/AgCl) in $N_2$-saturated 0.5 M $H_2SO_4$ with 0.5 M CHOOH was also recorded.

Electrochemical active surface area (ECAS) and CO poisoning tolerance of catalyst samples were demonstrated by CO stripping voltammetry. In stripping voltammogram, CO was bubbled through 0.5 M $H_2SO_4$ electrolyte solution for 30 min, keeping working electrode in the cell under constant applied electrode potential of 0.2 V. After purging by $N_2$ gas for 20 min to aerate the dissolved CO, CO stripping voltammograms were recorded from −0.2 to 1.2 V (vs. Ag/AgCl) at a scan rate of 20 mVs⁻¹ to ensure the complete oxidation of $CO_{ads}$. Finally, ECAS were calculated using 0.42 mC/cm² for $CO_{ads}$ monolayer (Andrzej Czerwiński, Electroanal. Chem. 379(1994) 487-493; Hyun J K, Won 1 K, Tae J P, Hyung S P and Dong J S., Carbon 46(2008) 1393-1400; Ing. habil. Kai Sundmacher, Mihai Christov, habil. Helmut Weiβ, Kinetics of Methanol Electro-oxidation on PtRu Catalysts in a Membrane Electrode Assembly, 2005, page 27 each incorporated herein by reference in its entirety).

EXAMPLE 13

CO Stripping Analysis

Figure 7A:
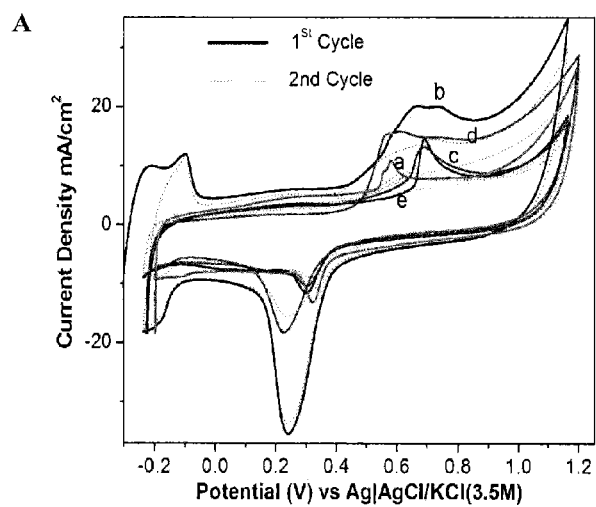
FIG. 7a illustrates the first and second cycles of CO stripping measurements for PdPt/WO$_3$-supported electrocatalysts in 0.5 M H$_2$SO$_4$ at a scan rate of 20 mV/s, wherein (a) is Pd/OMC, (b) is Pd/WO$_3$-OMC, (c) is Pd$_1$Pt$_1$/WO$_3$-OMC, (d) is Pd$_2$Pt$_1$/WO$_3$-OMC and (e) is Pd$_1$Pt$_2$/WO$_3$-OMC.
Figure 7B:
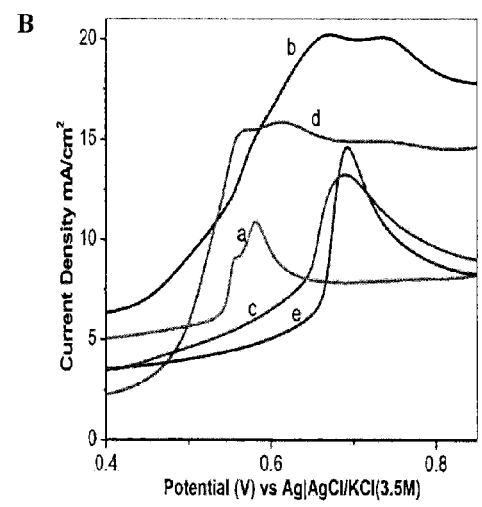

CO poisoning tolerance of PdPt-based electrocatalysts is demonstrated in FIGS. 7a and 7b by using carbon monoxide (CO) stripping voltammetry. FIG. 7a shows that the second CV cycle (dotted lines) in CO oxidation is almost overlapped with pre adsorbed CO stable curve which suggest that CO is completely oxidized in the first cycle of CO oxidation. From the figure, it is clear that onset potential (432 mV) of Pd/WO₃-OMC is 108 mV negatively shifted to that of Pd/OMC (540 mV) while peak potential is shifted 68 mV positively. Catalysts with lower onset potential are found to be better in catalytic activity for CO oxidation. So, this demonstrates that WO₃ addition enhances (onset potential) CO oxidation ability of modified support catalysts. For Pd₂Pt₁/WO₃-OMC catalyst, the onset potential and CO peak intensity laid at 358 mV and 16.3 mA/cm², respectively, which is 1.2 times negative shift in potential as compare to Pd/WO₃-OMC electrocatalyst. Table 2 summarizes both electrochemical active surface area (ECAS) of metals calculated by using 0.42 mC/cm² (Hyun J K, Won 1 K, Tae J P, Hyung S P and Dong J S., Carbon 46(2008) 1393-1400; Ing. habil. Kai Sundmacher, Mihai Christov, habil. Helmut Weiβ, Kinetics of Methanol Electro-oxidation on PtRu Catalysts in a Membrane Electrode Assembly, 2005, page 27—each incorporated herein by reference in its entirety) as charge associated to the monolayer on Pd and Pt nanoparticles and CO stripping measurements for all the studied catalysts. From Table 2, it is noted that the intensity of CO oxidation peaks and onset potential are varied with the increase of Pt contents. Lowest onset potential and maximum ECAS (62.4 m²/g) of Pd₂Pt₁/WO₃-OMC catalyst is considered as a potential CO tolerance catalyst.

TABLE 2

Electrochemical properties of catalysts on CO oxidation.

| Catalyst | Area of desorbed CO peak (mC/cm²) | CO Stripping $E_{onset}$ (mV) | $E_{peak}$ | $ECAS_{CO}$ ᵃ (m²/g metal) | Peak Intensity (mA/cm²) |
|---|---|---|---|---|---|
| Pd/OMC | 9.5 | 540 | 580 | 17.8 | 10.8 |
| Pd/WO₃-OMC | 67.6 | 432 | 648 | 26.7 | 20.7 |
| Pd₁Pt₁/WO₃-OMC | 15.7 | 636 | 682 | 29.4 | 14.6 |
| Pd₂Pt₁/WO₃-OMC | 33.3 | 358 | 551 | 62.4 | 14.2 |
| Pd₁Pt₂/WO₃-OMC | 23.4 | 454 | 689 | 43.9 | 6.4 |

ᵃ $ECAS_{CO} = \frac{\theta c}{w*0.42}$, $\theta c$ = mC/cm², w = 0.127 mg/cm², 0.42 mC/cm²

EXAMPLE 14

Cyclic Voltammetry Analysis

Figure 8A:
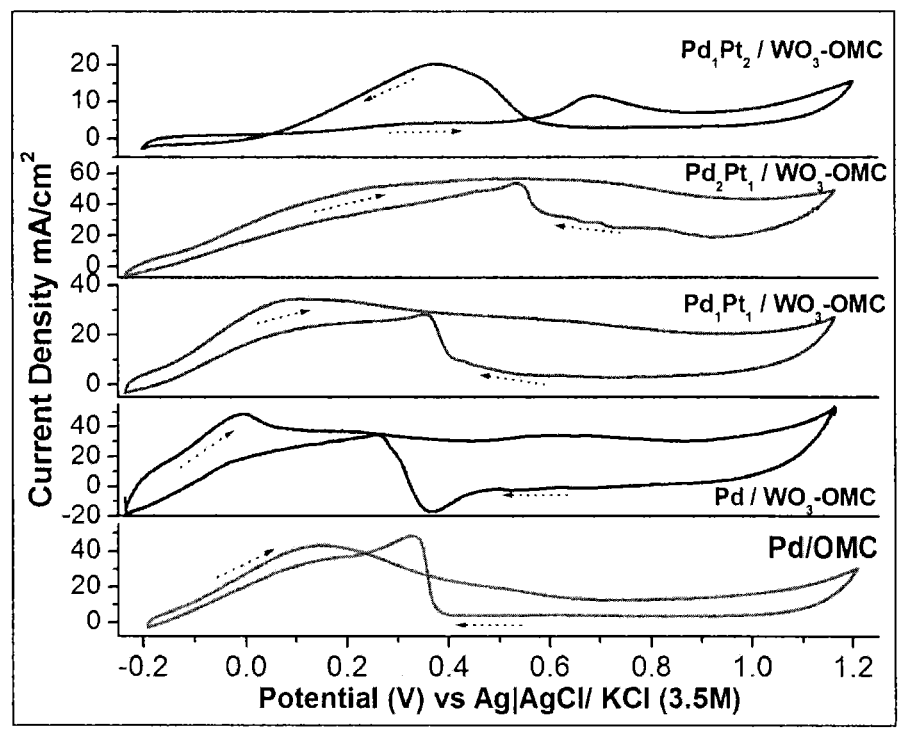
FIG. 8a illustrates cyclic volammetry (CV) patterns of Pd/OMC, Pd/WO$_3$-OMC and PdPt/WO$_3$-OMC electrocatalysts with various Pd:Pt ratios in 0.5 M H$_2$SO$_4$+0.5 M HCOOH solution.
Figure 8B:
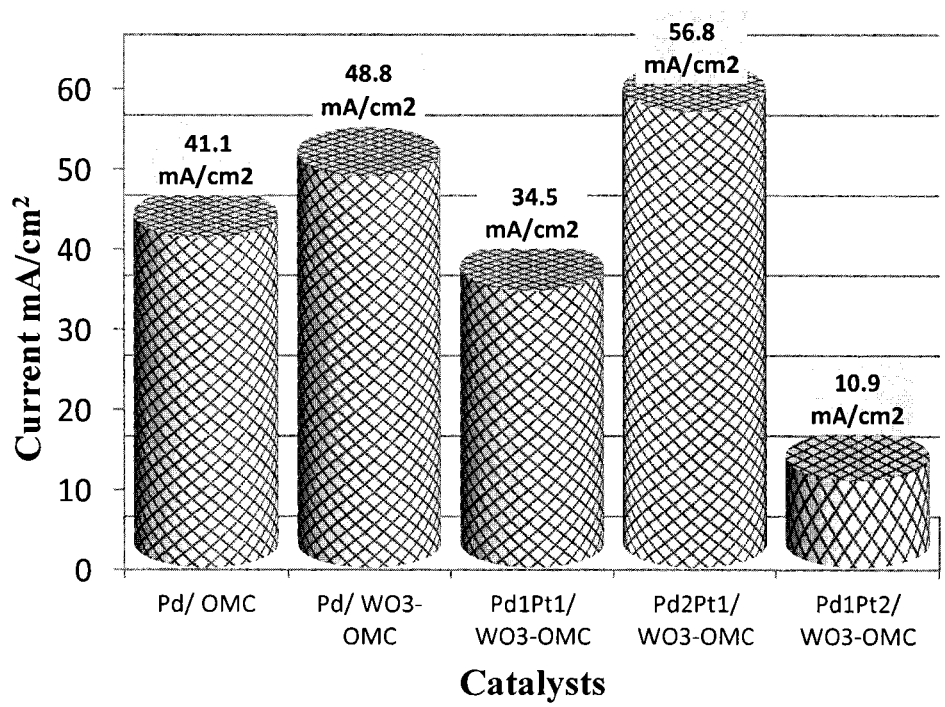
FIG. 8b is a bar graph showing maximum currents during CV patterns of Pd/OMC, Pd/WO$_3$-OMC and PdPt/WO$_3$-OMC electrocatalysts with various Pd:Pt ratios in 0.5 M H$_2$SO$_4$+0.5 M HCOOH solution.

The formic acid oxidation activity of the WO₃ modified electrocatalysts is investigated by CV (scan rate of 20 mV/s) in 0.5 M HCOOH and 0.5 M $H_2SO_4$ solution. Before the measurements $N_2$ gas was purged through electrode and electrolyte solution in order to deaerate the system. The CV analysis of all the catalysts is presented in FIG. 8a while FIG. 8b plots the maximum current for each catalyst. From FIGS. 8a and 8b, it can be seen that both intensities and peak potential of PdPt/WO₃-OMC catalysts are changing with Pd to Pt ratios. At peak potential of −8.6 mV, oxidation current density of Pd/WO₃-OMC catalyst is around 48.8 mA/cm² (3.41 A/mg) which is about 7 mA/cm² higher than that of Pd/OMC (41.1 mA/cm²) catalyst. This improved catalytic performance of Pd/WO₃-OMC is due to the well-built integration of OMC and WO₃ as observed in SEM and TEM analysis. Furthermore, the current density of Pd/WO₃-OMC is much greater than that of previously reported commercially available different carbon supports with Pd (Yang L Jun, Su Neng, Ting and Shi Jun, Sci China Chem. 55(2012) 391-397; Feng, L G; Yang, J; Hu, Y; Zhu, J B; Liu, C P Xing, W., Int. J. Hydrogen Energ. 37(2012) 4812-4818; Yu Zhu, Yongyin K, Zhiqing Z, Qun Z, Junwei Z, Baojia X and Hui Y., Electrochem. Commun. 10(2008) 802-805; Xiao M Wang, Yong Y X., Electrochim. Acta 54(2009) 7525-7530; Jun Y, Chungui T, Lei and Honggang F., J. Mater. Chem. 21(2011) 3384-3390; Yizhong Lu and Wei C, J. Phys. Chem. C 114 (2010) 21190-21200—each incorporated herein by reference in its entirety). As reported in FIG. 7(B), the current density of Pd₂Pt₁/WO₃-OMC catalyst for anodic scan is 56.8 mA/cm² which is 1.4, 1.2, 1.65 and 5.2 times higher than that of Pd/OMC, Pd/WO₃-OMC, Pd₁Pt₁/WO₃-OMC (34.5 mA/cm²) and Pd₁Pt₂/WO₃-OMC (10.9 mA/cm²) catalysts, respectively. The peak potential of Pd₂Pt₁/WO₃-OMC catalyst is also shifted positively as compared to the Pd/OMC, Pd/WO₃-OMC and Pd₁Pt₁/WO₃-OMC catalysts. It can be generally interpreted that the formic acid electro-oxidation on the two Pd/OMC and Pd/WO$_3$-OMC catalysts are much easier. However, due to large ECAS (reported in Table 2) and smaller crystal size of Pt, electrochemical oxidation of formic acid was enhanced for Pd$_2$Pt$_1$/WO$_3$-OMC catalyst (Yang L Jun, Su Neng, Ting and Shi Jun, Sci China Chem. 55(2012) 391-397—incorporated herein by reference in its entirety). Especially, with the decrease of particle size and Pd content ratio, the peak potential for formic acid electro-oxidation shifted positively.

Moreover, the oxidation peak of Pd$_1$Pt$_2$/WO$_3$-OMC catalyst at 677 mV is ascribed to go through a multiple steps or indirect oxidation pathway; CO species are intermediates which strongly adsorbed on the surface of the catalysts. Due to the poisoning effects on Pt surface oxidation current intensity reduced to 2.6 mA/cm$^2$ (Haan J L, Masel R I, Electrochim. Acta 54(2009) 4073-4078—incorporated herein by reference in its entirety), while in Pd/OMC, formic acid oxidation goes through a direct oxidation pathway (Wang J, Yin G, Chen Y, Li R, Sun X, Int. J. Hydrogen Energ 34 (2009) 8270-827—incorporated herein by reference in its entirety).

Form the above observation it may be concluded that the modification of OMC with WO$_3$ helps improving the peak current density (1.2 times higher than OMC), which positively affects the current activity of PdPt electrocatalysts. Also, the peak potential of Pd$_2$Pt$_1$/WO$_3$-OMC catalyst was shifted positively ca. 387 mV but it did not largely affect on catalytic activity of catalyst towards formic acid oxidation.

EXAMPLE 15

Chronoamperometry Analysis

Figure 9:
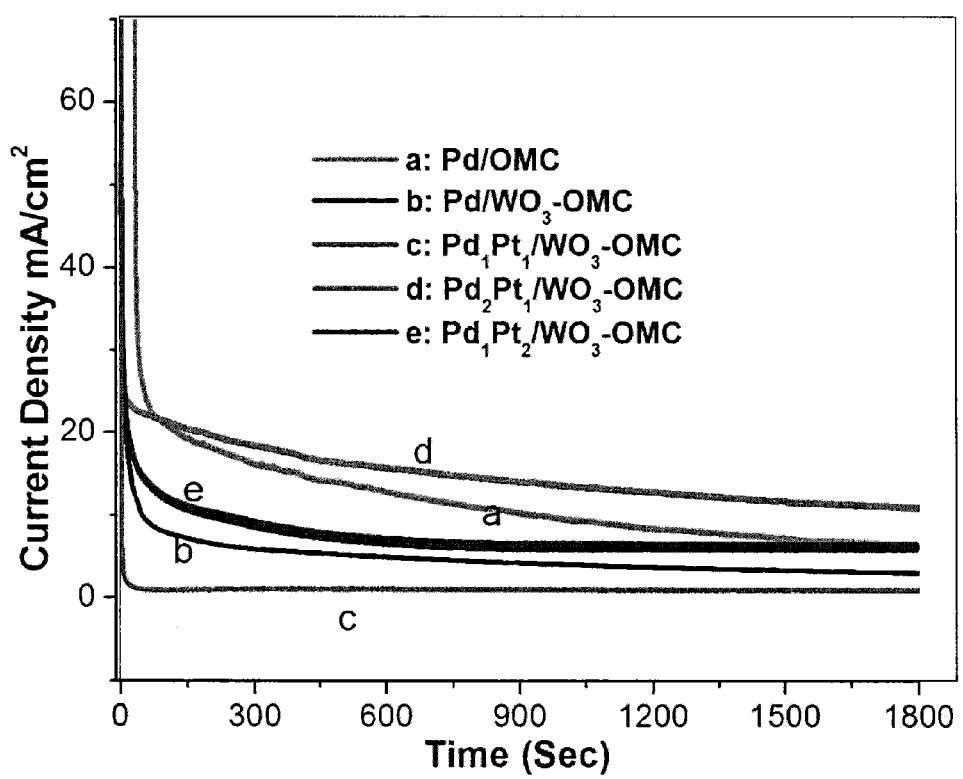
FIG. 9 illustrates chronoamperometry at 0.3 V (vs. Ag/AgCl) for Pd/OMC and PdPt/WO$_3$-OMC electrocatalysts in the N$_2$-saturated 0.5 M H$_2$SO$_4$ and 0.5 M HCOOH solution.

FIG. 9 displays the response curves of chronoamperometry measurements determining the performance durability and poisoning rate of tested catalysts in a solution of 0.5 M HCOOH and 0.5 M H$_2$SO$_4$ at 0.3 V constant potential. In all the catalysts, current density initially fall rapidly following a parabolic path and finally reached to a pseudo steady state at 1400 s. Bimetallic Pd$_2$Pt$_1$/WO$_3$-OMC electrocatalyst showed higher activity for formic acid oxidation than the activities using Pd/OMC and other PdPt/WO$_3$-OMC electrocatalysts. The steady state current density recorded on Pd$_2$Pt$_1$/WO$_3$-OMC catalyst was about 10.9 mA/cm$^2$ which was 1.6 times higher than the steady state current density with Pd/OMC (6.6 mA/cm$^2$) catalyst. Current densities for Pd/WO$_3$-OMC, Pd$_1$Pt$_1$/WO$_3$-OMC and Pd$_1$Pt$_2$/WO$_3$-OMC catalysts were 3.3 mA/cm$^2$, 1.4 mA/cm$^2$ and 6.1 mA/cm$^2$, respectively. From these results it is confirmed that WO$_3$-based electrocatalyst showed somewhat high performance stability and particularly Pd$_2$Pt$_1$/WO$_3$-OMC catalyst exhibit high catalytic activity and stability towards HCOOH electro-oxidation.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An electrocatalyst for a fuel cell electrode comprising: nanoparticles of Pd as a first catalytic metal; nanoparticles of Pt as a second catalytic metal; and a catalyst support material comprising nanoparticles of an ordered mesoporous carbon and nanoparticles of WO$_3$; wherein the Pd and Pt nanoparticles are present in a ratio of x:y and x>y.

2. The electrocatalyst of claim 1, wherein x and y are independently 1, 2 or 3.

3. The electrocatalyst of claim 1, wherein the electrocatalyst catalyzes the oxidation of formic acid into CO$_2$.

4. The electrocatalyst of claim 1, wherein a total amount of Pd and Pt present in the electrocatalyst is no greater than 30% by weight relative to the total weight of the electrocatalyst.

5. A direct formic acid fuel cell comprising:
the electrocatalyst of claim 1 as an anode;
a cathode;
a proton exchange membrane electrolyte disposed between the anode and the cathode;
a formic acid solution in contact with the anode; and
a solution comprising at least one oxidizing agent in contact with the cathode.

6. The formic acid fuel cell of claim 5, wherein the ratio of Pd:Pt ranges from greater than 1:1 to 3:1.

7. The formic acid fuel cell of claim 5, wherein the amount of Pd is no greater than 15% of the total weight of the electrocatalyst.

8. The formic acid fuel cell of claim 5, wherein the amount of Pt is no greater than 15% of the total weight of the electrocatalyst.

9. The formic acid fuel cell of claim 5, wherein the amount of ordered mesoporous carbon is 75-85% of the total weight of the electrocatalyst.

10. The formic acid fuel cell of claim 5, wherein the amount of WO$_3$ is 7-10% of the total weight of the electrocatalyst.

11. The formic acid fuel cell of claim 5, wherein the ordered mesoporous carbon has a BET specific surface area of at least 800 m$^2$g$^{-1}$.

12. The formic acid fuel cell of claim 5, wherein the ordered mesoporous carbon has a pore size of no greater than 4 nm.

13. The formic acid fuel cell of claim 5, wherein the ordered mesoporous carbon has a pore volume of 1.0-1.5 cm$^3$g$^{-1}$.

14. The formic acid fuel cell of claim 5, wherein the Pd and Pt nanoparticles are no greater than 5 nm.

15. The electrocatalyst of claim 1, which has a total amount of Pd and Pt from 15-30% by weight relative to the total weight of the electrocatalyst.

16. The electrocatalyst of claim 1, wherein the ratio of Pd:Pt ranges from greater than 1:1 to 3:1.

17. The electrocatalyst of claim 1, wherein the ratio of Pd:Pt is 2:1.

18. The electrocatalyst of claim 1, which has 75-85% by weight of the nanoparticles of the ordered mesoporous carbon relative to the total weight of the electrocatalyst.

19. The electrocatalyst of claim 1, wherein the ordered mesoporous carbon has mesopores with a diameter between 3 and 4 nm.

20. The electrocatalyst of claim 1, which has a 5-15 wt % of WO$_3$ relative to the total weight of the electrocatalyst.

* * * * *